T. Salorgne,
Wheel.

No. 79602.  Patented July. 7. 1868

Witnesses:  Inventor:

United States Patent Office.

THEODORE SALORGNE, OF ST. LOUIS, MISSOURI, ASSIGNOR TO JACOB WOODBURN.

Letters Patent No. 79,602, dated July 7, 1868.

IMPROVEMENT IN WAGON AND CARRIAGE-WHEELS.

The Schedule referred to in these Letters Patent and making part of the same.

TO ALL WHOM IT MAY CONCERN:

Be it known that I, THEODORE SALORGNE, of St. Louis, in the county of St. Louis, and State of Missouri, have made certain new and useful Improvements in Wagon and Carriage-Wheels; and I do hereby declare that the following is a full and clear description thereof, reference being had to the accompanying drawings and to the letters of reference marked thereon.

The object of this invention is to protect the felloe of the wheel against being split by the insertion of the spokes into the mortises provided for them in the said felloe, or by the wear or unequal shrinkage of the parts while in use.

The invention consists in perforating the felloe transversely at one or both sides of each spoke-mortise, and inserting in these perforations screw-protecting wires, of the peculiar construction hereinafter described, the form and application of these screw-wires constituting the chief feature of this invention. These retaining wires must be the same size throughout their entire length, and applied to the wheel without riveting or heading on either side of the wheel, else they would mar and deface the side of the wheel to such an extent as to render the application valueless.

To enable those skilled in the art to make and use my improved wheels, I will proceed to describe their construction and operation.

Figure 1:
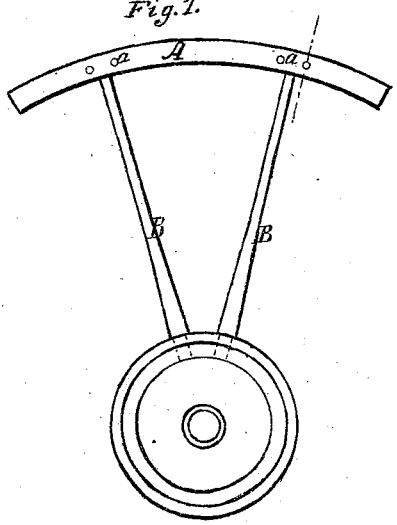

Figure 1 of the drawings represents a sectional side elevation of one of the improved wheels.

Figure 2:
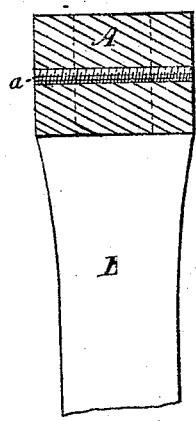

Figure 2 is a transverse section of the felloe through one of the screw-retaining wires.

The felloe A is constructed in the usual manner, and applied to the spoke B the same as in wheels now in use, with the exception of being perforated with one or more holes by the side or sides of the spoke-mortises, in such a manner as to receive the screw-wires $a$, passed transversely through the felloe from side to side. These wires $a$ are to be the same size throughout their entire length, and are to have their peripheries provided with V-threads, similar to those on wood-screws, except that they are not to be gimlet-pointed. These wires are to be made in long pieces, of, say, two or three feet each, (more or less,) and are to be screwed into the holes previously provided in the felloe, as hereinbefore described, by means of suitable machinery provided for that purpose. After the screw-wire shall have been screwed entirely through the felloe in this manner, it is to be cut off close to the side of the felloe, and then filed and rubbed up smooth on both sides of the wheel, so as not to disclose its presence when the wheel shall have been finished, and polished, and varnished up, ready for use.

It is evident from the foregoing description, that neither a rivet, having a head on one or both its ends, nor even a common wood-screw, would answer the purpose of the wire, $a$, as the heads which would then have to be exposed on the face of the wheel would so mar its beauty as to render it valueless.

Having described my invention, what I claim is—

The felloe, perforated transversely at one or both sides of each spoke-mortise, and the screw-protecting wires inserted in these perforations, when constructed as herein described and for the purpose set forth.

THEO. SALORGNE.

Witnesses:
M. RANDOLPH,
GEO. P. HERTHEL, Jr.